United States Patent
Mamona et al.

(10) Patent No.: US 8,390,639 B2
(45) Date of Patent: *Mar. 5, 2013

(54) METHOD AND APPARATUS FOR ROTATING AN IMAGE ON A DISPLAY

(75) Inventors: Andrzej S. Mamona, Woodbridge (CA); Oleksandr Khodorkovsky, North York (CA)

(73) Assignee: QUALCOMM Incorporated, San Diego, CA (US)

( * ) Notice: Subject to any disclaimer, the term of this patent is extended or adjusted under 35 U.S.C. 154(b) by 596 days.

This patent is subject to a terminal disclaimer.

(21) Appl. No.: 11/465,043

(22) Filed: Aug. 16, 2006

(65) Prior Publication Data

US 2008/0043032 A1 Feb. 21, 2008

Related U.S. Application Data

(63) Continuation of application No. 09/772,789, filed on Jan. 30, 2001, now Pat. No. 7,113,194.

(51) Int. Cl.
*G06G 5/00* (2006.01)

(52) U.S. Cl. ..................................... 345/582
(58) Field of Classification Search .................. 345/582
See application file for complete search history.

(56) References Cited

U.S. PATENT DOCUMENTS

| | | | | |
|---|---|---|---|---|
| 5,113,357 | A * | 5/1992 | Johnson et al. | 345/424 |
| 5,592,599 | A | 1/1997 | Lindholm | |
| 5,724,492 | A | 3/1998 | Matthews et al. | |
| 5,751,295 | A * | 5/1998 | Becklund et al. | 345/503 |
| 5,900,881 | A | 5/1999 | Ikedo | |
| 5,973,664 | A * | 10/1999 | Badger | 345/659 |
| 5,977,983 | A * | 11/1999 | Einkauf et al. | 345/582 |
| 6,137,468 | A * | 10/2000 | Martinez et al. | 345/649 |
| 6,184,896 | B1 * | 2/2001 | Sowizral et al. | 345/644 |
| 6,390,918 | B1 * | 5/2002 | Yagi et al. | 463/32 |
| 6,466,206 | B1 | 10/2002 | Deering | |
| 6,577,769 | B1 | 6/2003 | Kenyon et al. | |
| 6,744,442 | B1 | 6/2004 | Chan et al. | |
| 6,825,851 | B1 | 11/2004 | Leather | |
| 7,113,194 | B2 * | 9/2006 | Mamona et al. | 345/649 |
| 2002/0101419 | A1 * | 8/2002 | Cook | 345/426 |
| 2002/0101439 | A1 | 8/2002 | Mamona et al. | |

* cited by examiner

*Primary Examiner* — Edward Martello
(74) *Attorney, Agent, or Firm* — James R. Gambale, Jr.

(57) ABSTRACT

A method and apparatus utilizes a three dimensional rendering engine to rotate an image based on user selected or otherwise determined screen orientation. A vertex coordinate transformation is defined for a rotated destination image. The source image is used as a texture for texture mapping during rendering operation to produce rotated image. In one embodiment, a separate set of software instructions is used for each orientation mode. Accordingly, a non-pixel by pixel based 3D rotation may be carried out using a 3D rendering engine to avoid a single parameter based seriatim pixel by pixel based orientation.

36 Claims, 3 Drawing Sheets

METHOD AND APPARATUS FOR ROTATING AN IMAGE ON A DISPLAY

RELATED CO-PENDING APPLICATION

This application is a continuation of U.S. application Ser. No. 09/772,789 filed Jan. 30, 2001, which issued as U.S. Pat. No. 7,113,194, and is entitled "Method and Apparatus for Rotating an Image on a Display", having as inventors Andrzej S. Mamona et al., and owned by instant assigned and is incorporated herein by reference.

FIELD OF THE INVENTION

The invention relates generally to methods and apparatus for rotating images on a display screen, and more particularly to methods and apparatus for rotating a screen image using a 3D rendering engine.

BACKGROUND OF THE INVENTION

The use of display screens for gaming tablets is known. For example, multiple players may wish to use a laptop computer screen to display a game or other non-game information to different viewers. Systems are known that allow the rotation of the image of, for example, a 90°, 180°, and 270° rotation so that the gaming tablet or screen may be oriented toward different viewers around a table, so that each viewer can view the display in a proper orientation with respect to their position about the table.

One example of such a system is described in U.S. Pat. No. 5,973,664 entitled "Parameterized Image Orientation for Computer Display". With this system, a software driver, using for example a host processor, uses the same software instructions for each orientation mode. The driver uses parameters to determine where each successive pixel goes in a display memory. For example, the driver (i.e., the host processor) moves pixels from a source memory to display memory using an x and y parameter to rotate an image on a pixel by pixel basis by stepping seriatim through each pixel of the source image and moving the pixel to a corresponding area in display memory using the x and y parameter. The rotation is made directly on a line by line pixel by pixel basis into a display memory. Such a system may require large amounts of host processing time since the calculation of each pixel location is performed on a pixel by pixel basis by stepping, seriatim, through each pixel in a source image and moving the pixel to a display memory based on a single x and y increment value, typically by a host processor.

Other drivers are known that modify image information before putting it into display memory to produce a desired orientation on a computer display. Typically, the code used to effect the orientation of an image in one mode is not used to effect the orientation in another mode. Drivers typically use a host processor to carry out the rotation and thus can unnecessarily overburden the host and decrease performance. With increasing image complexities and the desire to speed up the processing of a host processor, it would be desirable to provide a more efficient mechanism for rotating an image on a display screen.

Also, three dimensional rendering engine are known that receive drawing commands that include primitive information and rendering 3D images. Such 3D rendering engines receive as part of the vertex information, primitive information such as vertex coordinates, color values for each vertex, texture coordinates for one or more textures that are applied to a primitive, specular information, and other information.

However, such 3D rendering engines are not known to rotate rendered images. Given their presence in many display systems, it would be desirable to utilize their capability to facilitate image rotation.

Accordingly, a need exists for an improved image rotation apparatus and method.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

Briefly, a method and apparatus utilizes a three dimensional (3D) rendering engine to rotate an image based on user selected or otherwise determined screen orientation. A texture mapping is defined for a source image. The source image is treated as a texture and mapped to the destination area. A software driver is used to calculate vertices of the destination area according to the selected orientation mode. In one embodiment, a separate set of software instructions is used to calculate vertices for each orientation mode. Accordingly, a non-pixel by pixel based 3D rotation may be carried out using a 3D rendering engine to avoid a single parameter based seriatim pixel by pixel based orientation. The method and apparatus map the source image into rotated destination area in the display memory.

Figure 1:
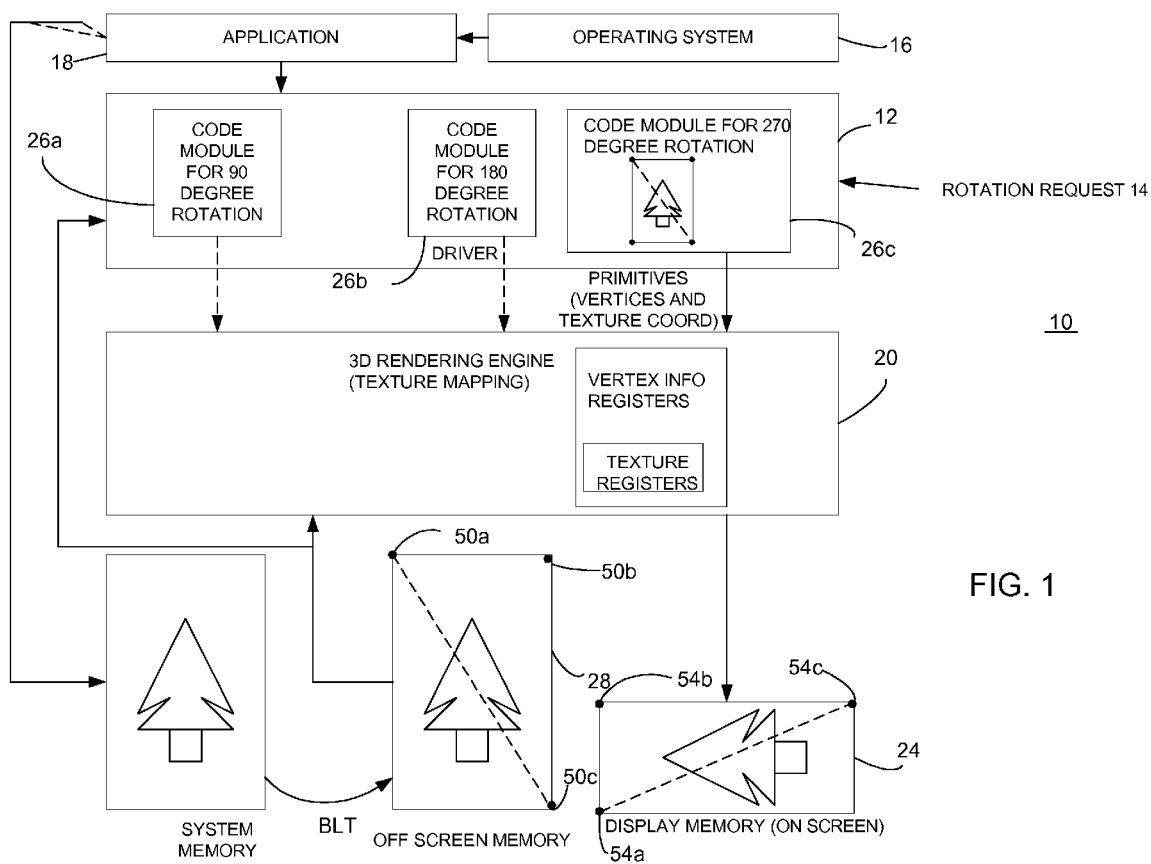
FIG. 1 is a block diagram illustrating one example of an apparatus for rotating an image in accordance with one embodiment of the invention.

FIG. 1 illustrates an apparatus 10 such as a laptop computer, an Internet appliance or other device having a display screen in which an image is rotated to one of a determined orientation. In this example, the apparatus includes a host processor (not shown) that executes a driver application 12 that receives a rotation request 14 via a user interface, rotation detection sensor, or any other suitable source. In this particular example, the rotation request 14 is a request to rotate the image 270°. The apparatus 10 includes an operating system 16, an image generating application, such as a game, word processing application, windows-based application or any other suitable software application, a 3D rendering engine 20, non-display memory 28 containing, for example, a source image, and display memory 24 which may be read, for example, by a CRTC or any other suitable video device that reads rows and columns of display memory for immediate display on a display device. Although not necessary, for purposes of illustration and not limitation, the source image stored in non-display memory 28 is a bit map.

The driver 12 includes a different instruction set 26*a*-26*c* for each of a plurality of selected screen orientations to initiate the defining of destination area for texture mapping of the source image. In this example, the rotation request comes from a user selected orientation that includes at least one of a 90° rotation, a 180° rotation, and a 270° orientation. The driver may be stored in any suitable storage medium such as a CD ROM, system memory, volatile memory, other nonvolatile memory, may be downloaded from an Internet storage location, or may be resident in any suitable storage medium.

The 3D rendering engine 20 may be part of a graphics processor, as known in the art, that performs rendering using texture mapping based on primitives (e.g., vertex data). As known in the art, the 3D rendering engine includes various vertex information registers that store information associated with each vertex of a primitive. Such registers may include registers that store vertex coordinate information on a per vertex basis such as coordinate information, color information, texture information (e.g., coordinate on texture associated with the vertex). It will be recognized that the 3D rendering engine 20 is preferably implemented as a hardware rendering engine that uses primitive vertices, such as vertices of triangles or rectangles to represent portions of images. One such 3D rendering engine may be the type found in a RAGE PRO™ graphics processor manufactured by ATI Technologies Inc., Thornhill, Ontario, Canada. However, it will be recognized that any suitable rendering engine may be used.

Figure 2:
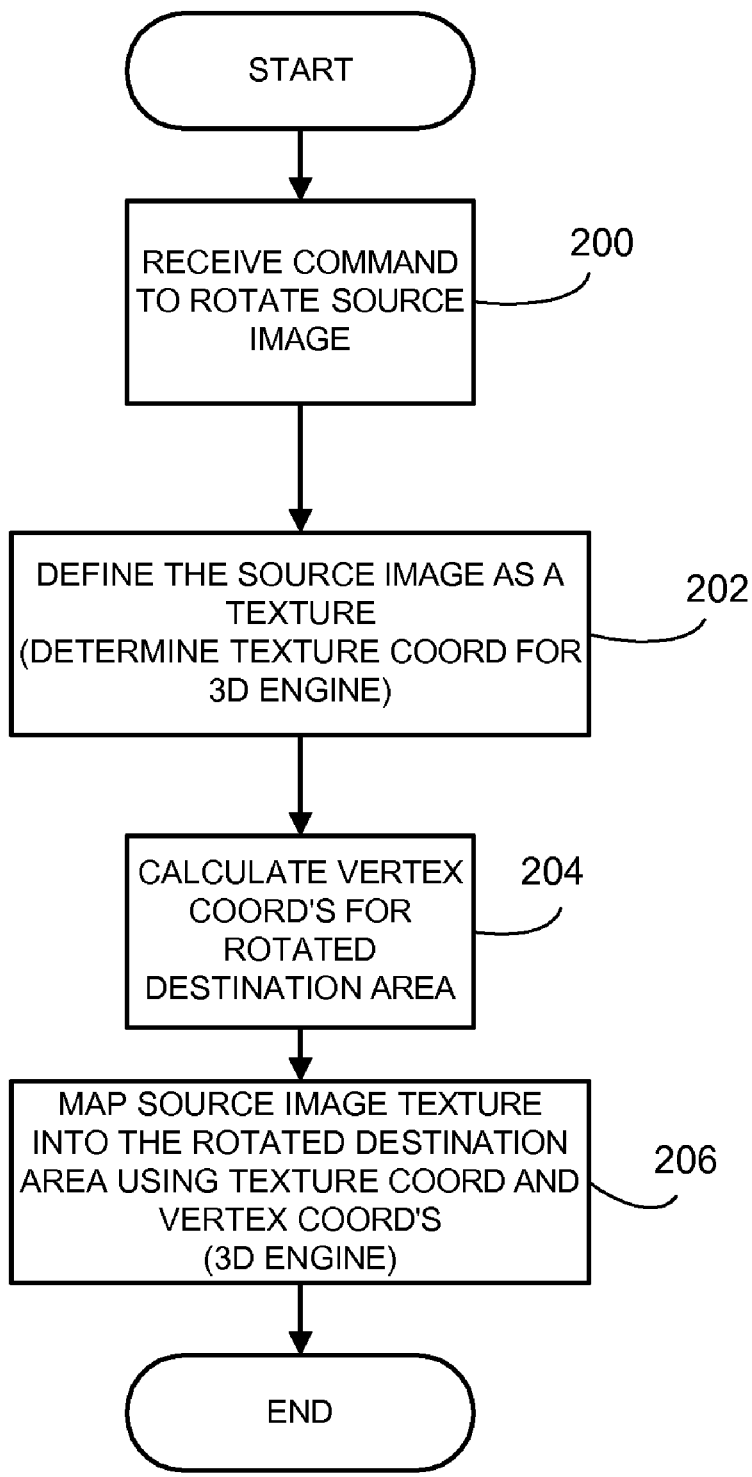
FIG. 2 is a flow chart illustrating one example of a method for generating a rotated image in accordance with one embodiment of the invention.

FIG. 2 shows one method for rotating an image. In operation, the driver 12 receives the command to set a rotation mode such as rotation request 14, as shown in block 200. In this example, the rotation request 14 is a request to rotate the screen by 270° and to set the screen resolution to 600 by 800 as input via a GUI interface or other suitable manner.

The driver reports the requested resolution (in this example 600×800) to the operating system and application(s), but allocates display memory 24 with a different width and height. In this example, the driver 12 allocates an 800×600 resolution area of display memory as the rotated destination area. Additionally, the driver 12 allocates intermediate off-screen memory 28 in video memory of a graphics processor. The driver uses the off-screen memory 28 to copy the source images created in system memory. It will be recognized that the off-screen memory can be allocated to be less than the full screen size memory (display memory). In this case the driver will subdivide the source image into sections and copy each section into the intermediate off-screen memory piece by piece.

The method includes using the off-screen memory in a texture mapping operation. Accordingly, the 3D rendering engine uses the allocated off-screen memory 28 content as the texture.

As shown in block 202, the driver defines the source image as a texture by using the source image as a texture. Texture coordinates, which identify the content of the memory containing the source image are sent with the primitive information to the 3D rendering engine. As shown in block 204, in a preferred embodiment, the driver obtains the source image information in the off-screen memory and tessellates the source image into a plurality of triangle primitives by calculating vertices 50a-50c of the target area in the display memory. Tessellation may be carried out in any known manner. Target vertices 50a-50c are calculated depending on the rotation angle based on the received rotation command 14. For example, for a 270 degree rotation:

$$X\text{dest} = Y\text{source}$$

$$Y\text{dest} = \text{Width} - X\text{source}$$

Where Xdest is the destination x coordinate of a vertex in the display memory, Ydest is the destination y coordinate of the vertex in the display memory, Ysource is the y coordinate of the vertex in the offscreen memory, Xsource is the x coordinate of the vertex in the offscreen memory and Width is the width of the display memory.

Every vertex 54a-54c of the target is associated with the corresponding point 50a-50c of the source so that the driver provides texture coordinates for each vertex. As shown, the rectangular target can be tesselated into multiple primitives such as smaller rectangles or triangles subject to a specific implementation of the 3D engine. In such cases the rendering will be performed as a multi-pass operation.

The resulting primitive vertices are sent to the 3D engine in a format such as a conventional vertex information of primitives as understood by the 3D rendering engine. As shown in block 206, The 3D rendering engine performs a rotation by mapping the source image from the off-screen memory 28 to the rotated destination display area 24 based on the calculated vertices.

Stated another way, the application stores the source image as a bit map image, or the operating system stores the image as a bit map image. The driver 12 calculates the vertices of the rotated destination area and provides the texture coordinates for each calculated vertice and sends them to the 3D engine. The 3D rendering engine then maps the source image into rotated destination area using the bitmap as a texture. The 3D rendering engine stores the rotated image into the display memory from which it is displayed by a display engine, as known in the art.

Where the rotation angle is a different location angle other than 2700, a different instruction set 28a or 28b is executed such that each orientation has its own code. The above apparatus and methods treat the off-screen object as a texture and maps the texture from the off-screen memory into a destination surface which may be in the display surface memory on a vertex basis.

Figure 3:
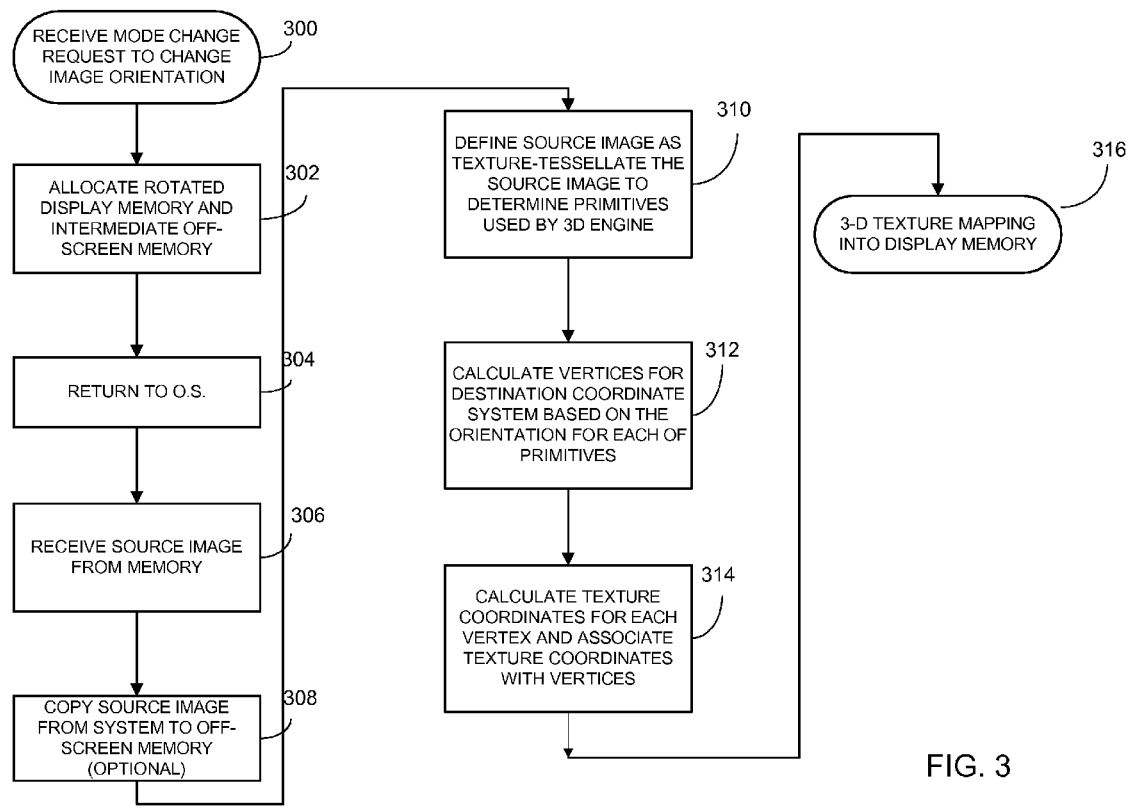
FIG. 3 is a flow chart illustrating one example of a method for generating a rotated image in accordance with one embodiment of the invention.

FIG. 3 shows in more detail, a method for rotating an image using a 3D rendering engine. As shown in block 300, the driver receives the rotation mode request 14 to change an image rotation angle. As shown in block 302, the driver allocates rotated display memory and intermediate off-screen memory based on the selected image orientation angle. The driver returns operation to the operating system as shown in block 304.

As shown in block 306, the driver receives the source image from the application. If this image resides in system memory, the driver (e.g., the host processor) copies it into offscreen video memory 28 as a bitmap, as shown in block 308. As shown in block 310, the method includes defining the source image as a texture and tessallating the source image to determine vertice primitives for a destination area to be used by the 3D rendering engine. As shown in block 312, the driver calculates the vertices for each resulting primitive for the destination coordinate system based on the angle of rotation. As shown in block 314, the method includes calculating, by the driver, the texture coordinates for each of the calculated primitive vertices, based on the angle of rotation and the source image. The driver (e.g., the host processor under control of the driver code) provides the resulting vertex information, including the per vertex texture coordinates to the 3D rendering engine by setting up the requisite 3D engine registers, including the vertex information registers. The 3D rendering engine then maps the texture to the rotated destination area for display by a CRTC or other suitable circuit, as shown in block 316.

The above process is triggered for example in response to the driver receiving a block transfer command to copy a rendered image into display memory. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for displaying images on a display screen, said method comprising:
   receiving a display screen orientation angle;
   defining a source image as a texture;
   generating geometric primitives for a three dimensional (3D) rendering engine, said geometric primitives corresponding to a rotated display screen image based upon the display screen orientation angle and the source image;
   mapping the texture onto the generated geometric primitives; and
   outputting the rotated display screen image based on the generated geometric primitives.

2. The method of claim 1 wherein said mapping is performed by the three dimensional (3D) rendering engine.

3. The method of claim 1 wherein said display screen orientation angle is received via a rotation detection sensor.

4. The method of claim 1 wherein said display screen orientation angle is received via a user interface.

5. The method of claim 1, wherein generating the geometric primitives for the 3D rendering engine comprises:
   calculating vertices of a target area based on the display screen orientation angle.

6. The method of claim 5, wherein calculating the vertices comprises calculating the vertices to tessellate the display screen image.

7. The method of claim 5, wherein calculating the vertices comprises associating each vertex of the generated geographic primitives with a corresponding point of the display screen image.

8. The method of claim 5, wherein further comprising storing the source image in an off-screen memory.

9. The method of claim 8, further comprising:
   mapping the source image from the off-screen memory based on calculating the vertices.

10. A non-transitory computer-readable medium storing instructions for causing a computing device to:
    receive a display screen orientation angle;
    define a source image as a texture;
    generate geometric primitives for a three dimensional (3D) rendering engine, said geometric primitives corresponding to a rotated display screen image based upon the display screen orientation angle and the source image;
    map the texture onto the generated geometric primitives; and
    output the rotated display screen image based on the generated geometric primitives.

11. The computer-readable medium of claim 10 wherein the three dimensional (3D) rendering engine maps the texture onto the generated geometric primitives.

12. The computer-readable medium of claim 10 wherein said display screen orientation angle is received via a rotation detection sensor.

13. The computer-readable medium of claim 10 wherein said display screen orientation angle is received via a user interface.

14. The computer-readable medium of claim 10, wherein the instructions further cause the computing device to:
    calculate vertices of a target area based on the display screen orientation angle.

15. The computer-readable medium of claim 14, wherein the instructions further cause the computing device to:
    calculate the vertices to tessellate the display screen image.

16. The computer-readable medium of claim 15, wherein the instructions further cause the computing device to:
    calculate the vertices by associating each vertex of the generated geographic primitives with a corresponding point of the display screen image.

17. The computer-readable medium of claim 15, wherein the instructions further cause the computing device to:
    store the source image in an off-screen memory.

18. The computer-readable medium of claim 17, wherein the instructions further cause the computing device to:
    map the source image from the off-screen memory based on calculating the vertices.

19. An apparatus for displaying images on a display screen, comprising:
    a first processor configured to receive a display screen orientation angle;
    wherein said first processor is also configured to define a source image as a texture;
    wherein said first processor is also configured to generate geometric primitives for a second processor, said geometric primitives corresponding to a rotated display screen image based upon the display screen orientation angle and the source image;
    wherein said second processor configured to map the texture onto the generated geometric primitives; and
    wherein at least one of said first processor said second processor are configured to output the rotated display screen image based on the generated geometric primitives.

20. The apparatus of claim 19 wherein said second processor is a three dimensional (3D) rendering engine.

21. The apparatus of claim 19 wherein said display screen orientation angle is received via a rotation detection sensor.

22. The apparatus of claim 19 wherein said display screen orientation angle is received via a user interface.

23. The apparatus of claim 19, wherein the first processor is configured to generate the geometric primitives for the 3D rendering engine by calculating vertices of a target area based on the display screen orientation angle.

24. The apparatus of claim 23, wherein the first processor is configured to calculate the vertices to tessellate the display screen image.

25. The apparatus of claim 23, wherein the first processor is configured to calculate the vertices via associating each vertex of the generated geographic primitives with a corresponding point of the display screen image.

26. The apparatus of claim 23, wherein the first processor is further configured to:
    store the source image in an off-screen memory.

27. The apparatus of claim 26, wherein the first processor is further configured to:
    map the source image from the off-screen memory based on the calculated vertices.

28. An apparatus for displaying images of an application on a display, comprising:
    means for receiving a display screen orientation angle;
    means for defining a source image as a texture;
    means for generating geometric primitives for a three dimensional (3D) rendering engine, said geometric primitives corresponding to a rotated display screen image based upon the display screen orientation angle and the source image;
    means for mapping the texture onto the generated geometric primitives; and
    means for outputting the rotated display screen image based on the generated geometric primitives.

29. The apparatus of claim 28 wherein the means for mapping is performed by the three dimensional (3D) rendering engine.

30. The apparatus of claim 28 wherein said display screen orientation angle is received via a rotation detection means.

31. The apparatus of claim 28 wherein said display screen orientation angle is received via a user interface.

32. The apparatus of claim 28, wherein the means for generating the geometric primitives further comprises means for calculating vertices of a target area based on the display screen orientation angle.

33. The apparatus of claim 32, wherein the means for calculating the vertices tessellates the display screen image.

34. The apparatus of claim 32, wherein the means for calculating the vertices associate each vertex of the generated geographic primitives with a corresponding point of the display screen image.

35. The apparatus of claim 32, further comprising means for storing the source image in an off-screen memory.

36. The apparatus of claim 35, wherein the means for generating the geometric primitives maps the source image from the off-screen memory based on the means for calculating the vertices.

* * * * *